United States Patent [19]

Kermisch

[11] 4,236,809
[45] Dec. 2, 1980

[54] LOW RESOLUTION CORRECTION APPARATUS AND METHOD FOR ELECTROPHOTOGRAPHIC COPIERS

[75] Inventor: Dorian Kermisch, Penfield, N.Y.

[73] Assignee: Xerox Corporation, Stamford, Conn.

[21] Appl. No.: 71,829

[22] Filed: Sep. 4, 1979

[51] Int. Cl.³ ............................................. G03G 15/01
[52] U.S. Cl. ...................................... 355/4; 355/3 R; 355/32
[58] Field of Search ................. 355/4, 3 R, 32, 35–38; 118/645; 358/300; 346/157

[56] References Cited

U.S. PATENT DOCUMENTS

| | | | |
|---|---|---|---|
| 4,046,471 | 9/1977 | Branham | 358/300 X |
| 4,122,462 | 10/1978 | Hirayama et al. | 358/300 X |

*Primary Examiner*—R. L. Moses
*Attorney, Agent, or Firm*—Michael H. Shanahan

[57] ABSTRACT

A color copier having high resolution projection optics is modified to include low resolution electrical correction method and apparatus. A latent electrostatic image of an original is generated with conventional lamp and lens projection optics. This optical latent image is corrected for tone or color in real time by a parallel raster exposure arrangement. A raster input scanner (RIS) generates electrical raster image signals representative of the original. A processor converts electrical correction signals according to a prescribed scheme from the raster image signals. A raster output scanner (ROS) generates a raster latent image generated in registration with the optical latent image in response to the electrical correction signals. The RIS uses charge coupled devices (CCD's) to generate the electrical raster signals and the ROS uses a laser, and galvanometer to generate the raster latent image.

17 Claims, 8 Drawing Figures

LOW RESOLUTION CORRECTION APPARATUS AND METHOD FOR ELECTROPHOTOGRAPHIC COPIERS

BACKGROUND

This invention relates to electrophotographic reprographic methods and apparatus. In particular, this invention pertains to improvements to optical projection method and apparatus used to create latent electrostatic images of originals sought to be reproduced.

Image quality in electrophotography, photography and printing arts is a function of the resolution power of the medium in which an image is created. Current day electrophotographic equipment produces high quality images that contain detail resolved at about or above 500 line pairs per inch. This is generally considered high resolution for electrophotography whereas a resolution of about 100 line pairs per inch or below is generally considered as low resolution.

Besides resolution, the density range that a medium can reproduce also effects image quality. A wide density range is desired when the object to be copied contains a wide range of densities. Herein, density is used to refer to difuse reflection density for a white background but should also be understood to include spectral reflection density and transmission density.

When color originals are being reproduced, the faithfulness of the color reproduction affects image quality or acceptability. Without color correction techniques, a color process cannot reproduce well an original made from the reproduction process.

Color and tone corrections are made in the color photograph and printing arts, among other ways, by laser scanning techniques. Typically, an original is scanned point by point by a photocell in a line by line raster pattern. The individual color content and tone, i.e. density, of each point or pixel is represented by an electrical signal which is evaluated by a computer and both color and tone corrected. The corrected electrical signal is then used to modulate the intensity of a spot of light moved point by point in a raster pattern over a photographic emulsion. The correction is made directly to the image or video signal, as such the correction is analogous to a multiplicative color correcting mask in the color graphic arts. The emulsion is generally a very high resolution medium being able to resolve as high as 1500 line pairs per inch. The size of the scanning spot is generally limited however to dimensions that reduce the process resolution to about 1000 line pairs per inch. There are no lenses used to project a light image to the emulsion. By using only a scanning spot exposure of the emulsion, there is no need to register a scanned image with an optically projected image.

The Xerox 6500 Color Graphite Printer (CGP) is a Xerox 6500 color machine modified to include a laser scanner for exposing the machines photoconductive drum. However, the laser exposure mechanism is fed by video signals generated independently of an original on the platen of the copier. There are no presently known electrophotographic machines, either color or black and white (monochrome), that use a raster scanner in parallel—i.e. in an additive mode—with lamp and lens projection optics to make a color or tone corrected copy.

The composition of an original to be copied also affects the quality of a copy. Specifically, electrophotographic machines have difficulty accurately reproducing continuous tone originals because of the high contrast inherent to the electrophotographic processes. Also, if the machine has a half-toning screening mechanism, it has difficulty reproducing half-tone originals. The rescreening creates beat frequencies in the copy that may be objectional to a human observer. The present invention includes an input raster scanning mechanism that is most applicable to producing copies of continuous tone originals.

SUMMARY

Accordingly, it is a principal object of this invention to improve the ability of electrophotographic machines to copy continuous tone originals.

It is also an object of this invention to include an additive image correction capability in an electrophotographic copier or reprographic machine that uses optical projection optics.

Another object is to add a color correction capability to a color electrophotographic machine like the Xerox 6500 color copier.

A related object to the foregoing is to improve the color copying ability of a machine of the type like the Xerox 6500 Color Copier. Presently, the Xerox 6500 makes the most faithful color copies of function color originals. These are originals that contain colors made up of the eight possible combinations (including black and white) of cyan, magenta and yellow pigments or dyes each at full density.

Still another object of this invention is to achieve image corrections in electrophotographic machines by adding comparatively inexpensive spot scanning exposure equipment to an optical projection exposure machine.

Clearly, it is an object here to improve the quality of copies made by electrophotographic reprographic equipment.

The foregoing and other objects of this invention are achieved by recognizing that the image created by the high resolution optical projection exposure portion of an electrophotographic machine is significantly enhanced by combining with it a correction image created by a comparatively low resolution—and therefore low cost-spot scanning equipment. The correction image is one that corrects the optically created image density, color or a combination of each. This additive or parallel electrical correction scheme has no analogy in the graphic arts including photography and printing.

In one embodiment, an original (i.e. a target to be reproduced) is placed on a moving platen. The platen travels past stationary lamps and lens that make up part of an optical exposure means and past a stationary CCD array that makes up part of a raster exposure means. The reproduction is made on a photoconductive drum (or belt) rotating synchronously with the moving platen.

During a single revolution of the drum, a full latent electrostatic image of the original is formed on the drum by the optical exposure means. The optics project a slit image of the original from the platen to the drum. The movement between platen and drum enables the slit to sweep out a full image of the original. Similarly, the CCD array generates electrical raster signals in a line by line fashion that collectively represent a full raster image of the entire original. The equipment for generating the raster signals is referred to as a raster input scanner.

The raster signals are applied to a raster output scanner to expose the drum to a light image represented by the raster signals. The raster output scanner includes a laser that generates a narrow beam of light which is focused to a spot on the drum. A mirror mounted on a galvanometer sweeps the laser spot across the drum at a high speed relative to the drum peripheral movement. An optical modulator in the path of the laser beam modulates the intensity of the spot in response to the raster signals to produce a raster latent electrostatic image on the drum.

The optical and raster latent images are formed on the photoconductive drum during the same revolution. The two images are in registration. The raster image is a low resolution correction image for the high resolution optical image. The resultant latent image is of a significantly enhanced quality relative to that achieved solely with the optical exposure means alone. In the case of a color copying machine, the combined optical and raster exposure means permits the machine to make good color copies of continuous tone originals.

In color television, the transmitted luminance signal is broadcast over a broader channel than the color content signals. This is done because the human eye statistically perceives brightness variations more sensitively than it does hue variations. However, the color television art is not analogous or relevant to the present invention because the television imaging process takes places totally in the raster scan, electrical signal environment. In contrast, the invention here corrects a high resolution optical image with a low resolution electrical raster image.

For a description of the U.S. television simultaneous or compatible color system see *Electronics Engineers' Handbook*, by Donald G. Fink and Alexander A. McKenzie, McGraw-Hill, Inc., 1975, pp 20-3 through 20-15.

The use of a laser scanner in an electrophotographic device is known. The Xerox 6500 Color Graphic Printer (CGP) has been on sale for more than a year. The 6500 CGP is a Xerox 6500 modified to include a laser scanner. The Xerox 6500 is described in U.S. Pat. No. 3,854,449, the disclosure of which is incorporated by reference herein.

The 6500 CGP includes a photoconductive drum, a platen for holding a color original, lamps and lenses for illuminating an original at the platen and for projecting a narrow transverse section of an image of the original onto the photoconductive drum. The lamps and lenses move synchronously with the drum and a full latent electrostatic image of the original is formed on the drum after the lamps and lenses have scanned the length of the platen. This latent image is developed with toner forming a toner image that is transferred to the copy sheet. The process is repeated three times to make a color copy. Red, green and blue transmission filters are inserted sequentially into the optical axis of the lenses to create three separation images. The separation images are developed with cyan, magenta and yellow toner. The three different color toner images are transferred in registration to the same side of the same copy sheet to form a full color copy of the original.

The laser scanner in the 6500 CGP is a raster output scanner device. It is mounted within the frame of a 6500 copier and includes a helium-neon laser, spot focusing lenses and a pivoting galvanometer with a mirror mounted on it. The laser spot is swept back and forth across the photographic drum over a linear path by the galvanometer mirror. The spot exposure is located separately from the optical exposure generated by the moving lamps and lenses. The intensity of the laser spot is modulated in accordance with received video signals. The video signals are sent to the 6500 CGP from a separate video signal generating device. Typical applications are for the video signals to be those descriptive of a color CRT display terminal.

The noteworthy distinction between the Xerox 6500 CGP and the present invention is that the video signal is not generated from a scan of the original on the 6500 platen. In other words, the laser exposure and optical exposure mechanisms operate independently of each other as far as the original on the platen is concerned. Typical applications of the 6500 CGP are the alternate production of color copies from an original on the platen of from video signal generated by a remote device and applied to the laser scanner modulator.

U.S. Pat. No. 4,149,183 issued to Ronald J. Pellar and Leland D. Green describes a color electrophotographic machine in which an original is scanned by a moving light spot to generate electrical signals representative of the original. The electrical image or video signals are applied to a modulator in a raster output scanner that exposes a photoconductive drum. Actually, the original is scanned by three lasers, red, blue and green to generate color separation images, in electrical form of the original. The electrical separation images are color corrected prior to their application to the raster output scanner. Here, the scanner mechanism is the sole exposure means. The Pellar and Green scanner is the high resolution type and, consequently, like the photographic and printing arts, there is no need or reason to include an optical exposure mechanism.

THE DRAWINGS

Other objects and features of the invention are apparent from a complete reading of the specification and from the drawings which are.

DETAILED DESCRIPTION

The present invention includes creating, in registration, a low resolution correction image over a high resolution optical image on a photoconductor. For color copiers, the correction image includes a color correcting image emperically derived in the case of continuous tone originals and logically derived in the case of high contrast color originals. (These will be discussed more fully below.) For black and white (i.e. monochrome) copies, the correction image is a tone correction image that makes corrections to an optical image to expand its dynamic range. The hybrid arrangement of optical and electronic exposure mechanisms in electrophotographic devices is novel. There is no analogy to the present additive technique in the graphic arts. In addition, the use in electrophotography of a low resolution electrical color correction image to improve a high resolution optical image is novel. Likewise, the use of real time corrections in parallel to an optical exposure in a reproduction machine is novel.

Figures 1, 2:
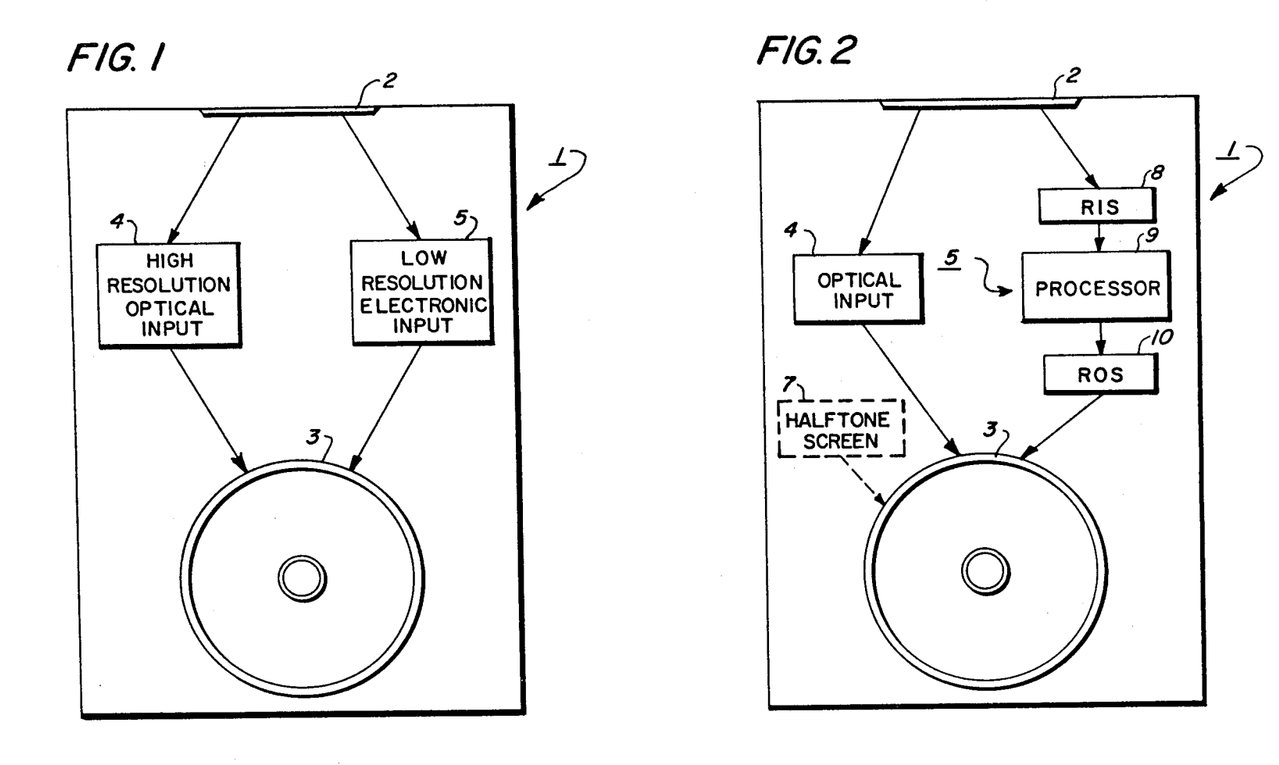
FIG. 1 is a schematic, side elevational view of a copier of the present design.
FIG. 2 is a schematic, side elevation view of the copier of FIG. 1 showing additional detail.

Turning to FIG. 1, an electrophotographic apparatus 1 is shown in schematic form. (None of the drawings are to scale.) The reprographic apparatus 1 includes a moving platen 2 and a photoconductive drum 3. The platen moves left to right, for example, synchronously with the clockwise rotation of drum 3. During the platens movement, an original placed on the platen is scanned simultaneously by the optical exposure means 4 and the raster exposure means 5 and each subject the drum to electromagnetic radiation in the form of an image corresponding to an original on the platen. The drum surface is uniformly electrostatically charged by a corotron (shown in FIG. 3) prior to an exposure from either the optical or raster exposure means. The exposures of the drum may occur simultaneously or sequentially with either the optical or raster exposure being first. The two exposures must be in registration with each other, however.

The exposure of the charged photoconductor results in the creation of latent electrostatic optical and raster images. These latent images are rendered visible by depositing a toner material over the surface of the exposed drum. The resultant toner image is a corrected version of a toner image created solely by an optical exposure. The toner image is typically transferred to a copy sheet where it is permanently fused or fixed to the sheet.

The photographic sense (positive or negative) of a latent electrostatic image is dependent upon the toner material in the development system. In the present discussion, the charge deposited onto the drum is positive. The exposure causes a reduction of the positive charge in the exposed regions. The toner material is selected to adhere electrostatically to the regions of high charge, i.e. the unexposed areas. The amount of toner adhering to the drum in a unit area is inversely related to the quantity of light (photons) impinging on the unit area, i.e. more exposure results in less toner. It should be understood that other electrophotographic systems operate by uniformly charging a drum surface with negative charge thereby requiring different electrostatic properties for the toner. Also, if it is desired in a given system to have toner adhere to the exposed rather than the unexposed areas, the electrostatic properties of the toner must be appropriately selected. In other words, electrophotographic systems can be adjusted to reverse the photographic image sense of a latent electrostatic image and such systems are intended to be included by this invention.

Furthermore, the present embodiments discuss platens that move synchronously with the photoconductor. Readily understood alternatives include systems wherein the platen is stationary and the optics and raster scan devices move. Also, flash exposure optical systems used with belt photoconductors (e.g. the Xerox 9200 copier duplicator) effectively define geometries in which the platen optics and photoconductor are stationary—at least during the duration of a flash exposure—relative to each other. These alternatives are intended to be within the scope of this invention.

FIG. 2 is a more specific schematic of the system shown in FIG. 1. (Like reference numbers for like elements are used throughout the different drawings where appropriate.) The raster exposure means 5 in FIG. 1 is shown in more detail in this drawing. Also, an optical, additive halftone screen 7 is shown as added to the system.

The raster exposure means of FIG. 2 includes the raster input scanner (RIS) 8, the processor or computer 9 and the raster output scanner ROS 10. The RIS 8 is preferably a charge coupled device (CCD) such as available from Fairchild Camera or what is referred to herein as a charge coupled photoconductive device (CCPD) such as that available from the Reticon Corporation. However, a moving spot scanner such as that described by Pellar and Green in the above cited U.S. Pat. No. 4,149,183 is suited for the present invention. (The disclosure of that patent is hereby incorporated herein by express reference). In fact, the Pellar and Green type of scanner is suited for scanning an original on a stationary platen when modified to include an extra deflection means for deflecting a laser beam in the y-axis as well as the present axis. Of course, the CCD devices can be made in two dimension arrays such that a full frame exposure of an original can be projected onto it thereby permitting the use of a stationary platen. The x-y deflection spot scanner and a two dimensional CCD array naturally add significantly to the cost of the system at least in terms of current economics. The cost of CCD devices is expected to improve meaningfully in the future.

The processor 9 is a microcomputer system such as the Motorola Corporation 6800 Exercisor system. The processor regulates the operation of the RIS, takes the raster image or video signals generated by it into buffers and processes the image signals to convert the raster video signal to a correction image signal. The processor also applies the correction signals to the ROS. It is the processor that coordinates the optical and raster exposures means to insure that the latent images created by each on the drum 3 are in registration.

The ROS 10 is a moving spot system that exposes the drum 3 to a light intensity proportional to the electrical correction image signals generated in the processor. An example of a suitable ROS mechanism includes that described in the above noted U.S. Pat. No. 4,149,183. Generally, a laser is the light source since it produces a collimated light beam suited for focusing to a small spot, e.g. to about 16 micrometers (microns) in diameter, yet with adequate energy to effectively discharge the photoconductor 3. The sweeping or moving action of the spot is typically obtained by rotating multifacet mirrors or by reciprocating mirrors attached to galvanometers. Also, a moving spot can be obtained without mechanical devices such as the galvanometer and rotating mirror. An example of a non-mechanical device is an optical defraction member whose internal defraction or reflection properties are varied electrically. Piezoelectric crystals are examples of such devices.

The half-tone screen 7 is a device to optically expose the charged photoconductor 3 prior to exposure by either the optical 4 or raster 5 exposure means. The screen 7 can be positioned to simultaneously or subsequently expose the drum relative to the other two exposure mechanism but it must do so prior to the drum surface being subjected to the toner.

The scrren means 7 includes a line screen (not shown) comprising, for example, a glass plate having opaque, narrow, parallel lines formed on the glass at intervals of about 10 microns. The glass plate is spaced about 0.5 millimeters (mm) from the drum 3. An incandescent lamp (not shown) floods the glass plate from the side away from the drum resulting in a line image being directed onto the drum 3. The line image is selected to be a desired spatial frequency suited for the density range of the original on platen 2 to be reproduced.

This screening function provided by device 7 is also able to be performed by the processor 9 and ROS 10.

Throughout, the original on the platen 2 is understood to be a continuous tone object. When screened or half-toned originals are used, a high resolution raster scanner is required to cope with the reproduction of the underlying screen frequency in the original. Also, the screening of a screened image which is inherent with a raster exposure device gives rise to beat patterns, e.g. Moire patterns, in the reproduction. The cost of the raster exposure means 5 is increased when the beat pattern suppression techniques are included within the raster exposure means 5.

Figure 3:
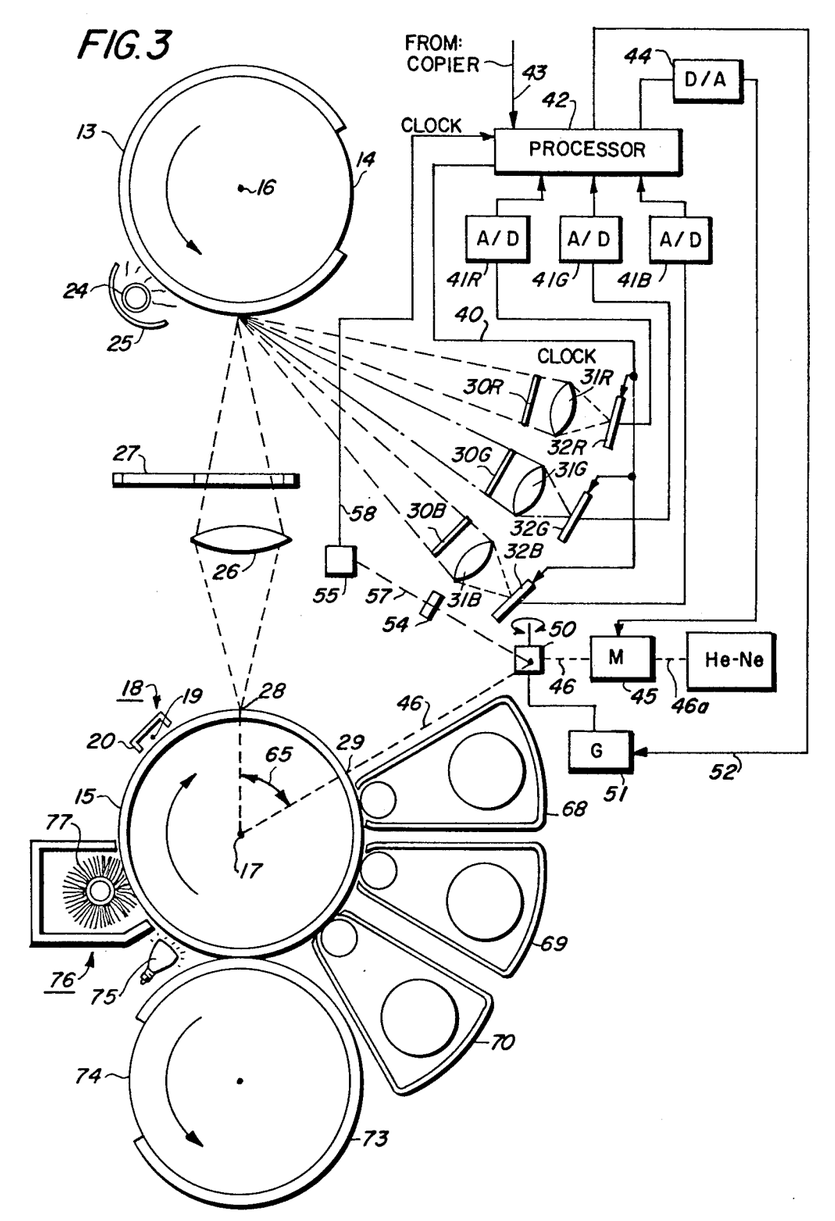
FIG. 3 is a side elevation view of a color electrophotographic system according to the present invention employing parallel optical and raster exposure means.

FIG. 3 depicts a rotating drum as the moving platen. The moving platens 2 of FIGS. 1 and 2 are preferred. The drum platen allows the drawing to be simplified for the present description. An original 13 to be reproduced is secured by appropriate means (not shown) to the periphery of the rotating cylindrical plate 14. Latent electrostatic images of the original 13 are created on the surface of photoconductive drum 15 by optical and raster exposure means. The platen 14 rotates counterclockwise and the drum 15 rotates clockwise in the example shown. The relative tangential velocity is zero for points on the surfaces of platen 14 and drum 15 intersected by lines connecting their axes of rotation 16 and 17. In practice, platen 14 with original 13 about its periphery has a diameter equal to the diameter of drum 15 and the magnitude of the platen and drum angular velocities are equal.

The corotron 18 uniformly electrostatically charges the surface of drum 15 as it rotates past the stationary device. The corotron includes a thin wire 19 that extends parallel to the axis 17 for at least the image forming length of drum 15. The drum includes a photoconductive layer over a conductive backing that is electrically grounded, for example. The thin wire is coupled to a high DC potential source, e.g. 2000 volts. The spacing between the drum and wire is about 20 cm. The shield 20 is electrically grounded to assist in the generation of an ion cloud about the thin wire that results from the ionization of air about the wire.

The optical exposure means for the system of FIG. 3 includes the lamp 24, reflector 25, lens 26 and color filter holder 27 which are all fixedly supported against movement. The lamp and reflector flood the length of platen 14 (parallel to axis 16) with illumination. The reflected light from the illumination linear region collected by lens 26 is focused onto the drum 15 at the optical exposure station 28. (The raster exposure station 29 is located to the right.)

A latent electrostatic image referred to as the optical latent image is formed on the drum 15 as the platen 14 rotates the original in an optical scanning fashion past the optical exposure means. As is well understood, the optical exposure system also includes a slit aperture plate (not shown) near station 28. Also, the optics may include mirrors to fold the projection axis for more convenient arrangement of the parts. The lens 26 in practice is a multiple lenses optical piece and the lens shown in FIG. 3 is intended to be functionally descriptive.

The color filter holder 27 includes means (not shown) for inserting sequentially, red, green and blue transmission filters into the optical axis of lens 26. The filters enable cyan, magenta and yellow, respectively, toner images to be created during three successive rotations of drum 15. The filter changing operation is explained in more detail in the disclosure of U.S. Pat. No. 3,854,449 incorporated by reference.

The raster exposure means includes the lamp and reflector 24 and 25 also used by the optical exposure means. The devices shown to the right of the lens 26 and filter holder 27 make up most of the balance of the raster exposure means.

The raset input scanner (RIS) portion of the raster exposure means includes three parallel scanners required for generation of a color correction image signal. The red RIS includes (along with the light source—lamp 24 and reflector 25—common to all the lenses shown in FIG. 3) the red transmission filter 30R, lens 31R and charge coupled device (CCD) 32R. Similarly, green RIS includes green filter 30G, lens 31G and CDD 32G and the blue RIS includes the blue filter 30B, lens 31B and CCPD 32B. The CCPD (e.g. the Reticon devices supra) device was required because it has a significantly higher response to blue light than the CCD's (e.g. the Fairchild Camera device, supra).

For economic reasons, a RIS system having a single lens is preferred over the three lens system of FIG. 3. One example of a single lens RIS is one in which a 3072 (for example) element (3×1024) array is employed. Adjacent elements in the array are covered with respectively red, green and blue filters. Each grouping of adjacent red, green and blue filtered elements establishes the picture element or pixel of the electrical image. Another example of a single lens RIS is one in which three 1024 (for example) element CCD arrays are placed in parallel closely together on a single chip. Here, the red, green and blue filters are associated with the three adjacent parallel elements. The filter function is best included as an inherent property of the arrays.

Figure 4:
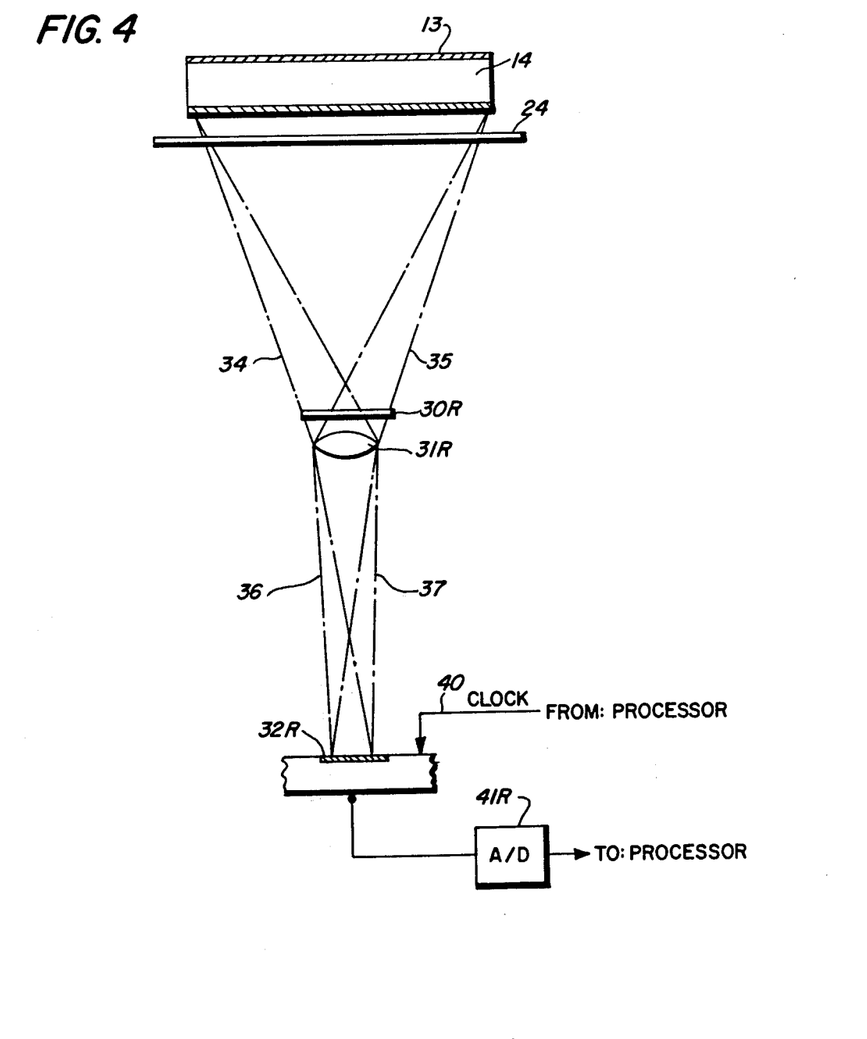
FIG. 4 is a plan view of the system of FIG. 1 limited to show one of the three raster input scanning means of FIG. 3.

The CCD's and CCPD include 1024 discrete elements onto which a line or slit image of the original is focused. FIG. 4 is helpful in the explanation. The three systems are the same (except for the CCPD already noted) and the description of one of the RIS pertains to all three. The red RIS is arbitrarily selected for the purpose of this description.

Lamp 24 is shown in FIG. 4 as extending the length of drum 15. (The reflector 25 is not shown in FIG. 4). Lamp 24 emits white light. The red light reflected from original 13 is passed by red filter 30R, collected by lens 31R and focused by the lens onto the 1024 element CCD 32R. For the case of an eleven inch original 13, the CCD has an effective resolution of about 93 line pairs per inch which is within the low resolution definition. The present invention shows good results for raster exposure resolutions as low as about 60 line pairs per inch which is substantially the practical lower limit.

The extreme light rays 34, 35, 36 and 37 are intended to depict the ability of the lens 31R to project an image the full length of the drum (for example, eleven inches) down to the CCD 32R which is only about 10 millimeters in length. The CCD stores charge on each of the 1024 elements proportionally to the intensity of the incident light from corresponding regions of the original. The charge is shifted serially out of the CCD from one end by the clock signal received over line 40. The clock signal is synchronized with the sweep rate of the scanning spot in the ROS discussed later. The analogue charge level from a given CCD element is applied to an analog to digital (A/D) converter 41R.

The A/D converter changes the analog charge level of an individual CCD element to a 5 bit digital number (for example) ranging from 0–31. (A larger bit number may be chosen, but for economy, the 5 bit representation is presently preferred.) The output of A/D converter 41R is therefore a 5 bit binary number representative of the red content of one of 1024 pixel elements in a line of original 13. The green and blue A/D converters 41G and 41B simultaneously generate 5 bit binary numbers representative of the green and blue intensity of the same pixel element in the original.

The 5 bit numbers are each loaded in parallel into a 14 bit register in processor 42 in FIG. 3. The two most significant bits in the register indicate if the copier is in the cyan, magenta or yellow cycle of platen 14 and drum 15. The remaining 12 bits contain the intensity information from the red, green and blue A/D converters 41R, G and B. Since each A/D converter generates a 5 bit number, three of the fifteen bits are dropped. No bits are dropped from the red A/D converter 41R when the machine is in the cyan cycle. Similarly, no bits are dropped from the green A/D converter 41G during the magenta cycle and no bits are dropped from the blue A/D converter 41B during the yellow cycle. The processor receives the current machine cycle information from over an appropriate input line 43.

During the various color cycles of the drum 15, the correction required is more dependent on some colors than others. The three dropped bits are dropped from the two secondary colors for a given cycle. For example, during both the cyan and magenta cycles the output of the blue A/D converter 41B is not that important to the correction. Consequently, during those cycles the two least significant bits from the blue A/D converter are dropped and the single least significant bit is dropped from either the green number during the cyan cycle and from the red number during the magenta cycle.

The number in the 14 bit register is then loaded into the 14 bit address memory of a look up table in the processor. That unique memory location contains an appropriate 6 bit (for example) binary number that represents a desired correction of the latent image on drum 15 for the unique color combination represented by the memory address.

The specific correction for a given combination of red, green and blue reflection intensities from a pixel element for each of the cyan, magenta and yellow cycles is determined emperically. The emperically derived numbers are pre-loaded into the processors memory. For the machine of FIG. 3, 12,288 memory cations were used with 4096 locations being assigned for unique numbers for each of the three color cycles.

The memory locations store 8 bit numbers. However, to simplify the ROS, only 6 bit binary numbers are used in the ROS of FIG. 3. The ROS includes the digital to analog (D/A) converter 44 which receives a 6 bit number from the look-up table memory in the processor that represents a correction to a given pixel in a latent image on drum 15. The D/A converter changes the binary number to an analog voltage which in turn is applied to the laser beam modulator 45. A helium-neon laser generates a collimated light beam 46 which is directed through the modulator 45. The modulator varies the amount of light passing through it proportionally to the applied voltage.

The modulated laser beam 46 thereafter is directed onto an oscillating mirror 50 mounted on the galvanometer 51. The galvanometer moves the mirror 50 back and forth under the command of the processor by signals received over electrical lead line 52. The mirror 50 oscillations sweep the modulated laser beam along the length of drum 15. The intensity of the beam over each pixel element on drum 15 is determined by an electrical correction signal applied to the modulator 45. The correction signal is one of the 4096 unique numbers stored in the processor memory corresponding to a correction suited for a particular combination of red, green and blue intensity levels in the unit area of a pixel.

Associated with the oscillating mirror 50 are sweep synchronization means including a Ronchi ruling 54 and a photodetector 55. The Ronchi ruling is a glass plate having grooves machined into it with a very high degree of precision. The rulings are equidistant and occur at a spatial frequency of about 120 rulings per inch. The total length of the ruling is about 10 inches.

Figure 5:
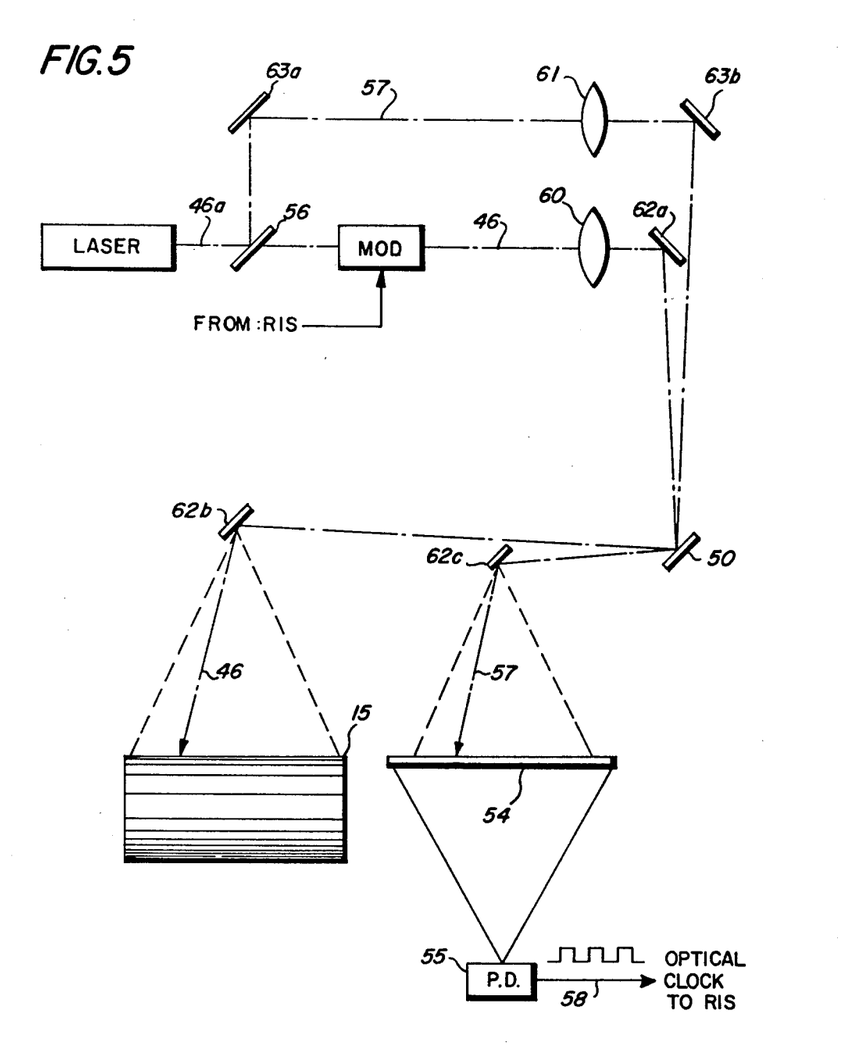
FIG. 5 is a schematic view in greater detail of the raster output scanning means for a system such as that of FIG. 3.

As better seen in FIG. 5, the laser beam 46a is divided by a beam splitter 56 to give rise to a beam 57 (also shown in FIG. 3) that is swept by the galvanometer mirror 50 over the Ronchi ruling. The photodetector receives varying amounts of light from beam 57 as the mirror sweeps beam 37 over the Ronchi ruling. Consequently, pulses are generated by the photodetector at each ruling and these signals represent the actual location and speed of the beam 46 moving along the axis of the photoconductor drum. The Ronchi Ruling includes a unique mark at one end to provide the processor with a start of scan signal from the photodetector 55. The output signals of the photodetector are fed to the processor 42 over lead line 58. These optical clock signals are used by the processor to shift the pixel information in the 1024 elements of the CCD's in a RIS into the processor.

Within the time it takes to write one pixel on drum 15, one clock period (i.e. the period of the signals out of photodetector 55) a number of operations take place. The A/D converters 41R, G and B convert the voltage levels on a pixel element into binary numbers and load that number into the address register for the processor memory. The unique correction number in the memory is fed to the D/A converter 44 and a color correction signal is applied to the modulator 45. To perform these, and other operations, the processor orchestrates events with a strobe signal generated by a phase-lock loop oscillator tied to the clock signal on line 58. The frequency of the strobe signal is selected to be about twenty times that of the clock signal on line 58.

FIG. 5 elaborates on the optical paths shown for the ROS in FIG. 3. The beam 46a is partially split off at beam splitter 56. About 90 percent of beam 46a continues onto the modulator 45 with the balance going into the synchronization means. The lenses 60 and 61 are used to converge and focus the beams 46 and 57 respectively onto the drum 15 and the Ronchi Ruling 55. Mirrors 62a and b are used to fold the optical path of the writing beam 46 and mirrors 63a, b and c are used to fold the optical path of beam 57. A cylindrical mirror (not shown) is positioned on the photodetector side of the Ronchi ruling to collect the light of beam 57 and direct it into the photodetector 55.

At this point, the optical and raster exposure means 4 and 5 of FIG. 1 have been fully described in terms of the embodiment of FIG. 3. The latent images created by each means are precisely overlaid on the drum, i.e. they are in registration. The registration is achieved by the described arrangement of apparatus. In particular, the optical lens 26 and RIS lenses 31R, G and B look at the same illuminated region of the original 13. The angle 65 between the optical and raster exposure stations 28 and 29 on drum 15 (see FIG. 3) is known as well as the angular velocity of the drum 15 and platen 14. The processor receives drum velocity information from the machine over the input line represented by lead 43.

The pixel element locations on platen drum 14 are matched to pixel elements on photoreceptor drum 15 by means of the clock signal on line 58. The pixel locations in the direction around drums 14 and 15 is controlled by the velocity information fed to the processor over lead 43. Misalignments of the raster image to the optical image are corrected by varying the timing within the processor. The magnification of the raster image is controllable by shifting the Ronchi ruling closer to or further from the galvanometer mirror 50. This effectively expands or contracts the clock period and therefore the dimension of the pixel elements.

Turning back to FIG. 3, the balance of the reprographic equipment will be described. After, the drum 30 leaves the region of the raster exposure station 29, the surface of drum 15 carries a color corrected latent electrostatic image for one of the three separation images: the cyan, magenta and yellow separation images.

The corrected latent image is developed by one of the three developer units 68, 69 and 70. These units contain respectively cyan, magenta and yellow toner. Assuming that the machine is in the cyan drum 15 cycle, the cyan developer is activated to deposit a cyan pigmented toner material over the drum surface. The toner adheres to the drum in areas corresponding to the latent electrostatic image creating a visible toner image of the original 13.

The cyan toner image, for example, is transferred to a sheet of copy paper 73 supported on the transfer drum 74. This drum, with the copy sheet thereon, matches the diameter of the photoreceptor drum 15 and rotates synchronously with it. Specifically, in the example of FIG. 3, the transfer drum 74 rotates counterclockwise. The transfer is achieved electrostatically due to an electric field in the region of the nip where drums 15 and 74 meet.

After the cyan toner image is transferred to the copy sheet 73, the surface of drum 15 is reconditioned in preparation for the formation of the magenta toner image, for example. The flood lamp 75 uniformly illuminates the drum 75 to drive the surface potential toward ground potential. The cleaning means 76 removes excess cyan toner particles from the drum. The rotating fiber brush 77 is effective to remove substantially all toner particles from the drum surface. Next, the surface of the drum returns to the start of the cycle under corotron 18 which uniformly charges the drum surface.

During the end of the cyan drum cycle, a red filter in filter holder 27 is replaced by a green filter. The original 13 is now recycled past the lamp 24 and lens 26 to create a magenta optical latent image. This image is color corrected by the raster exposure image with the processor aware that this is the magenta cycle. The resulting color corrected, magenta, latent image is developed with magenta toner as it passes the developer unit 69. The magenta toner image is transferred in registration with the cyan toner image onto the copy sheet 73 on the transfer drum 74.

Next the drum is again reconditioned, exposed with a blue filter in holder 27, color corrected and developed with yellow toner from developer unit 70. The yellow toner image is transferred in registration with the cyan and magenta toner images onto the copy sheet 73. The resultant cyan, magenta and yellow toner image forms a full color copy of the original 13. The copy is color corrected.

The loading and unloading of the copy sheet 73 onto and off drum 74 is described in the U.S. Pat. No. 3,854,449, supra.

A more simple version of the foregoing system is obtained by limiting the color content of the originals 13 to functional colors. Functional color is a term used herein, and by the Xerox Corporation in connection with the Xerox 6500 Color Copier, to include the eight possible color combinations (including white and black) that are formed from combinations of cyan, magenta and yellow pigments (or dyes) at full densities. When using a "functional color" original, the color correction scheme is simplified to erasing charge on the drum in accordance with the combinations of pigments in the picture element (pixel) on the original under examination.

The processor 42 and the A/D converters are not necessary for this simplified variation. The outputs of the CCD arrays 31R, G and B are, instead, fed to comparators (not shown) that compare the outputs from the CCD arrays to the levels 80–85 shown in FIGS. 6a–c. The red output of 31R is compared to level 80, the green output of 31G to level 81 and the green output of 31B to three levels 83, 84 and 85. The output of the comparators are processed by appropriate logic circuitry (not shown) that generates an "on" or "off" signal that is applied to modulator 45.

Figure 6A:
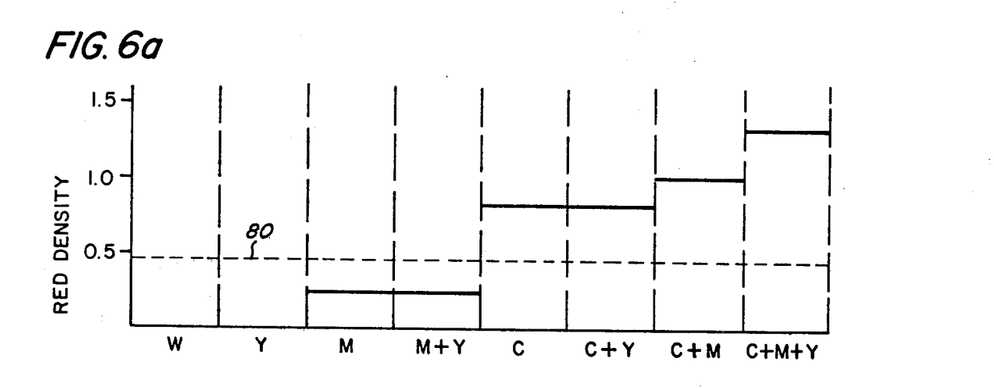
FIGS. 6a, 6b and 6c, respectively, are graphs of the red, green and blue densities for the eight combinations of cyan magenta and yellow relevant to an embodiment of the system in FIG. 3 that makes a limited color correction for high contrast color originals. W=white, c=cyan, m=magenta, y=yellow and plus (+) means "and".
Figure 6B:
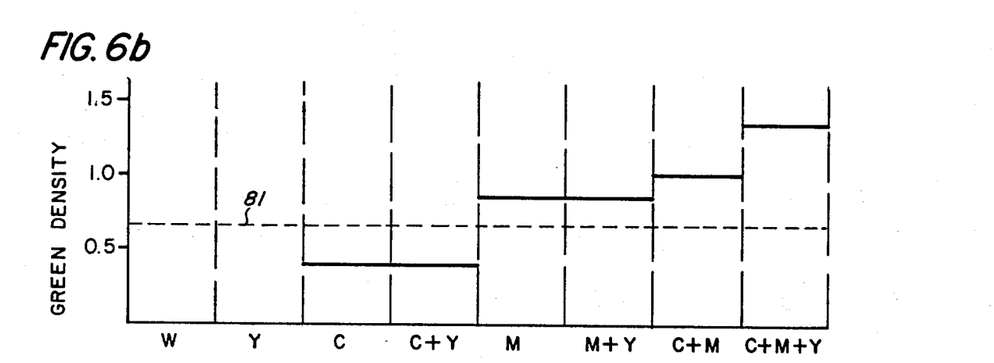
Figure 6C:
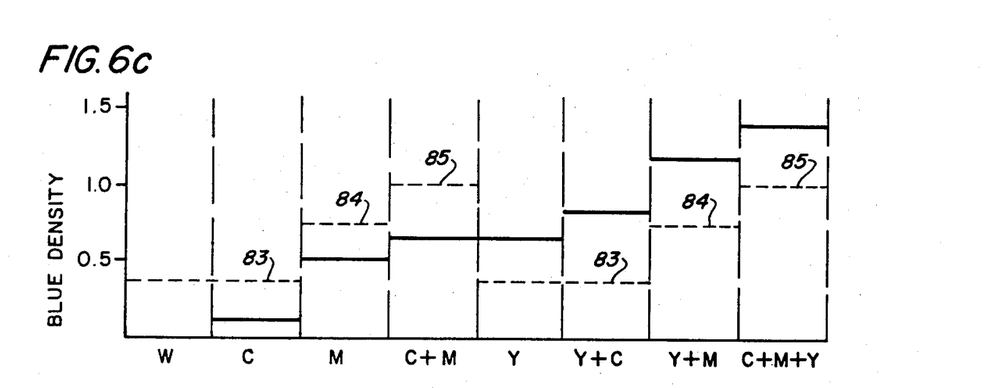

Level 80, FIG. 6a, is a density about midway between the highest red density of any of the eight pigment (or dye) combinations not containing cyan and the lowest density of any pigment (or dye) combination containing cyan. Level 81, FIG. 6b, is a density about midway between the highest green density of any of the eight pigment combinations not containing magenta and the lowest green density of any of the pigment combinations containing magenta. Level 83, FIG. 6c, is a blue density about midway between the blue density of cyan and of cyan in combination with yellow. Level 84, FIG. 6c, is a blue density about midway between the blue density of magenta and of magenta in combination with yellow. Level 85, FIG. 6c, is a blue density about midway between the blue density of a combination of cyan, and magenta and a combination of cyan, magenta and yellow.

Logically, as is determinable from an inspection of FIGS. 6a, b and c, laser is turned on during a cycle of drum 15 only when the color density associated with a given cycle is not due to the toner that is to be deposited on drum 15. In other words, during the cyan cycle, the laser is turned "on" only when a detected red density is a result of a pigment combination not containing cyan. Similarly, the laser beam is allowed to pass modulator 45—turned "on"—during the magenta and yellow cycles only when the detected green and blue densities are not due to magenta and yellow pigments, respectively, in the pixel under examination.

The logic circuitry preserves the small detail in an image because the laser is turned "on" to erase only when it is clearly necessary to do so. In the cyan cycle, it is turned "on" only when magenta is detected and no cyan is detected. This corresponds to the case when the red comparator coupled to array 32R detects a red density below level 80 and the green comparator coupled to array 32G detects a green density above level 81.

For the magenta cycle of drum 15, for like reasoning, the laser is turned "on" only when the red comparator detects a red density above level 80 and the green comparator detects a green density below level 81.

In the yellow cycle, a single comparator cannot accurately detect the presence or absence of yellow. Instead, three comparators are used to threshold the detected blue density with, respectively, blue densities corresponding to the levels 83, 84 and 85. The red and green comparators are also used to determine if cyan and magenta are present alone or together.

When no magenta is present—the green density detected by 31G is below level 81—the "yellow" decision is made by comparing the blue density to level 83. When the blue density is above level 83, yellow is present and the laser is not turned "on". When magenta but not cyan are present—the green density is above level 81 and the red density is below level 80—yellow is present if the blue density is above level 84. Finally, when both cyan and magenta are present—the red density is above level 80 and the green density is above level 81—yellow is present if the blue density is above level 85.

Because thin lines in original 13 are not resolved well by the present low resolution scanner, there is danger that thin lines in an original could be erased by the raster correction exposure image. To minimize this danger, the laser is turned "on" only in the areas where corrections are clearly needed and even then the intensity is adjusted to near the minimum permissible level. Consequently, small detail in the original like thin lines in the original are not corrected. However, the human eye is relatively insensitive to the exact hue of small detail. In addition, the edge enhancement characteristic of electrophotography operates to improve the resolution of the raster image beyond what would be expected from a low resolution scanner.

Various modifications to the described embodiments will be apparent to those skilled in the art. Such modifications are intended to be within the scope of this disclosure. For example, the raster correction exposure—as mentioned earlier—works in a black and white reprographic machine. The low resolution exposure means in the monochrome case is used to evaluate the density of a pixel element and make a correction to the optical latent image according to some desired scheme. The correction expands the dynamic range of the reprographic medium. Also, other color correction schemes for substractive color processes are possible.

What is claimed is:

1. Electrophotographic reprographic apparatus comprising
   a photoconductive member mounted for cyclic movement relative to corona generating means for charging the surface of the member and exposure means for exposing the charged surface of electromagnetic radiation for creation of latent electrostatic images,
   a platen for supporting an original to be reproduced,
   optical exposure means for exposing the charged member to an optical image of an original at the platen including lamp means for illuminating an original at the platen and lens means for projecting an image of an illuminated original to the charged member to create an optical latent electrostatic image and
   raster exposure means for exposing the charged member to a raster image of the same original at the platen including raster input scanning means for generating electrical raster image signals representative of an image of the original, processor means coupled to the raster input scanning means for generating correction signals corresponding to the raster image signals and raster output scanning means for moving a spot of illumination in a raster pattern over the charged surface and for modulating the intensity of the spot in response to the correction signals to create a raster latent electrostatic image,
   said optical and raster latent images being created during the same cycle of the photoconductor member and being in registration with each other.

2. The apparatus of claim 1 further including development means for depositing a toner material over the registered optical and raster latent images to create a toner image.

3. The apparatus of claim 2 further including transfer means for transferring toner images from the photoconductive member to a copy sheet.

4. The apparatus of claim 1 wherein the raster input scanner means includes lens means for exposing a CCD to an image of an original at the platen.

5. The apparatus of claim 4 wherein said CCD device includes a plurality of linearly aligned elements and filter means associated with at least every two adjacent elements for enabling light of different wavelengths from a single picture element in an original to be detected by the adjacent elements.

6. The apparatus of claim 5 wherein every three adjacent elements have filter means for detecting red, green and blue light from a single picture element.

7. The apparatus of claim 4 wherein said CCD device include a plurality of elements aligned in at least two parallel rows and filter means associated with adjacent elements from each row for enabling light of different wavelength from a single picture element in an original to be detected by the adjacent elements in the parallel rows.

8. The apparatus of claim 7 wherein three parallel rows of elements are used and the filter means enables adjacent elements from the three rows to detect red, green and blue light from a single picture element.

9. The apparatus of claim 1 wherein the raster output means includes a laser for generating a beam of light, lens means for focusing the laser beam to a spot on the member, sweep means for moving the spot over the surface of the member to recreate the raster pattern of the raster input scanning means and modulator means for modulating the intensity of the spot in response to the corrections signals.

10. The apparatus of claim 9 wherein the raster output scanning means further includes spot synchronizing means for generating electrical clock signals representative of the location of the spot in the raster scan pattern.

11. Electrophotographic reprographic apparatus comprising a photoconductive member mounted for cyclic movement relative to corona generating means for charging the surface of the member, a platen for supporting an original to be reproduced, optical exposure means for exposing the charged member to electromagnetic radiation during a single cycle to create an optical latent electrostatic image of an original on the platen including illumination means for illuminating an original at the platen and lens means for projecting a high resolution light image to the member to create the latent image and raster exposure means for exposing the charged member to a low resolution raster image of the original to enhance a latent image created by the optical exposure means during a single cycle including raster input scanning means for generating raster image signals by moving a scanning spot in a raster pattern over an original on the platen, processor means for processing the raster singals and raster output scanning means for moving a scanning spot in a raster pattern over the charged member to create the low resolution raster latent image of an original, said optical and raster latent images being formed in registration on the charged member during a single cycle of the photoconductive member.

12. The apparatus of claim 11 wherein the low resolution raster image is a density correction image for extending the density range of the optical latent image.

13. The apparatus of claim 11 further including development means for depositing toner material onto the registered optical and raster latent images to create a single visible, toner image.

14. The apparatus of claim 9 further including transfer means for transferring toner images to a copy sheet.

15. The apparatus of claim 14 wherein the developer means includes three separate developer means for depositing cyan, magenta and yellow toner materials during sequential cycles of the photoconductor member and wherein the transfer means includes a cyclic member for carrying a copy sheet and for moving synchronously with the cyclic photoconductive member to sequentially transfer toner images to the same side of the same copy sheet in registration during three sequential cycles of the photoconductor member.

16. The apparatus of claim 15 wherein the raster latent image is a color correction image for correcting the color content of an optical latent image made from a continuous tone color original.

17. The apparatus of claim 15 wherein the raster latent image is a color correction image for correcting the color content of made from a functional color original optical latent image.

* * * * *